July 6, 1926.
J. A. TUSHAUS ET AL
1,591,346
LUBRICATING SYSTEM
Filed June 10, 1925
3 Sheets-Sheet 1
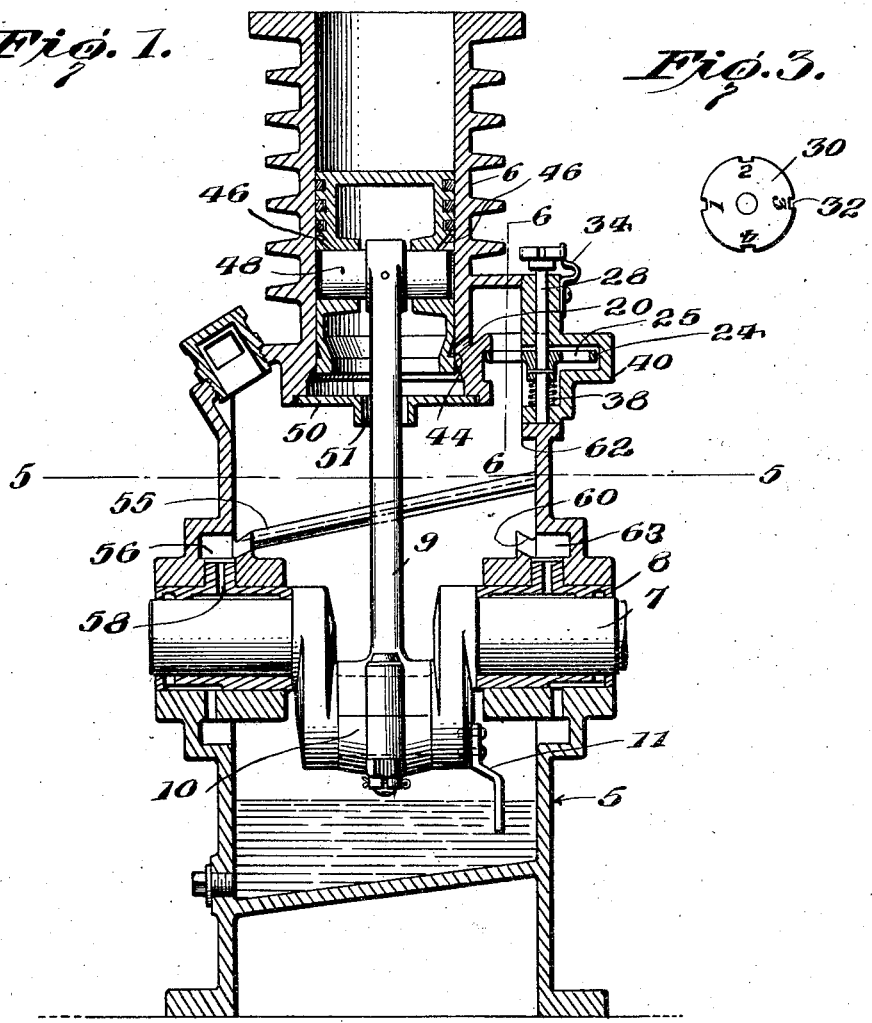

July 6, 1926. 1,591,346
J. A. TUSHAUS ET AL
LUBRICATING SYSTEM
Filed June 10, 1925 3 Sheets-Sheet 2

Inventor
John A. Tushaus
George F. Pfeifer
By Stevens and Batchelor
Attorneys

July 6, 1926.
J. A. TUSHAUS ET AL
1,591,346
LUBRICATING SYSTEM
Filed June 10, 1925
3 Sheets-Sheet 3
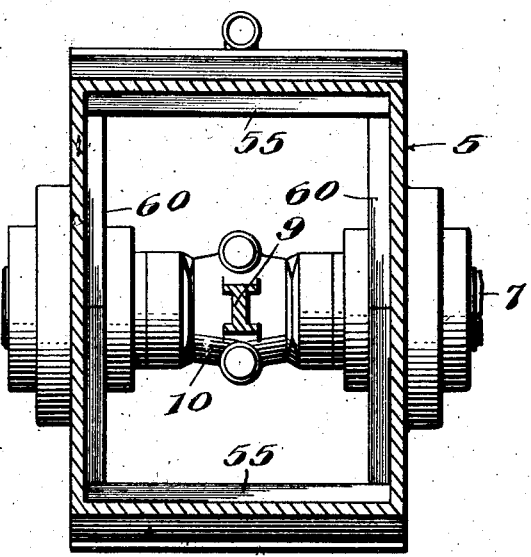
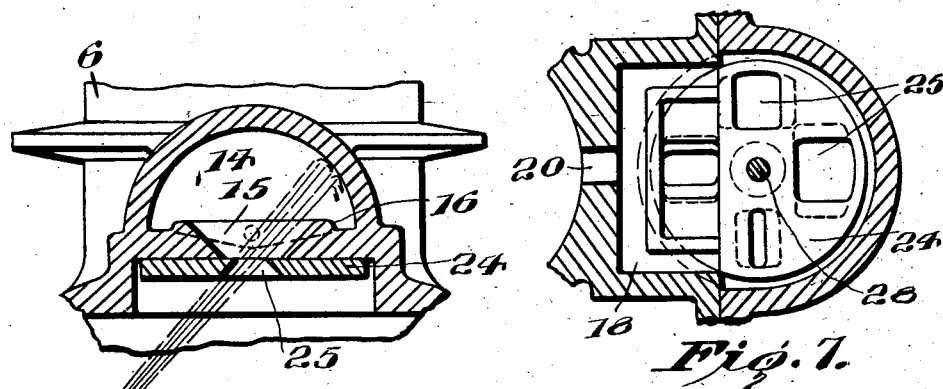

Patented July 6, 1926.

1,591,346

UNITED STATES PATENT OFFICE.

JOHN A. TUSHAUS, OF QUINCY, AND GEORGE F. PFEIFER, OF RIVERSIDE, ILLINOIS.

LUBRICATING SYSTEM.

Application filed June 10, 1925. Serial No. 36,250.

This invention relates to lubricating systems for air compressors, and the like.

Briefly stated, an important object of this invention is to provide a compressor having simple means whereby the flow of oil to the cylinder walls, the connecting rod bearing or bearings and the main bearings, is regulated and controlled to prevent an under or over supply of oil to any of these parts.

A further object is to provide a lubricating means for compressors which may be incorporated in a compressor at a small expense and without an elaborate change in the design of the compressor.

Other objects and advantages will be apparent during the course of the following description.

In the accompanying drawings forming a part of this application and in which like numerals are employed to designate like parts throughout the same, Figure 1 is a vertical sectional view through a single cylinder compressor constructed in accordance with this invention;

Fig. 2 is a perspective of an adjustable valve embodied in the invention and by means of which the supply of oil to the cylinder may be varied;

Fig. 3 is a plan view of an adjusting and indicating head embodied in the invention;

Fig. 5 is a horizontal sectional view taken on line 5—5 of Fig. 1;

Fig. 6 is a detail sectional view taken on line 6—6 of Fig. 1;

Fig. 7 is a detail horizontal sectional view taken on line 7—7 of Fig. 4.

Figure 4:
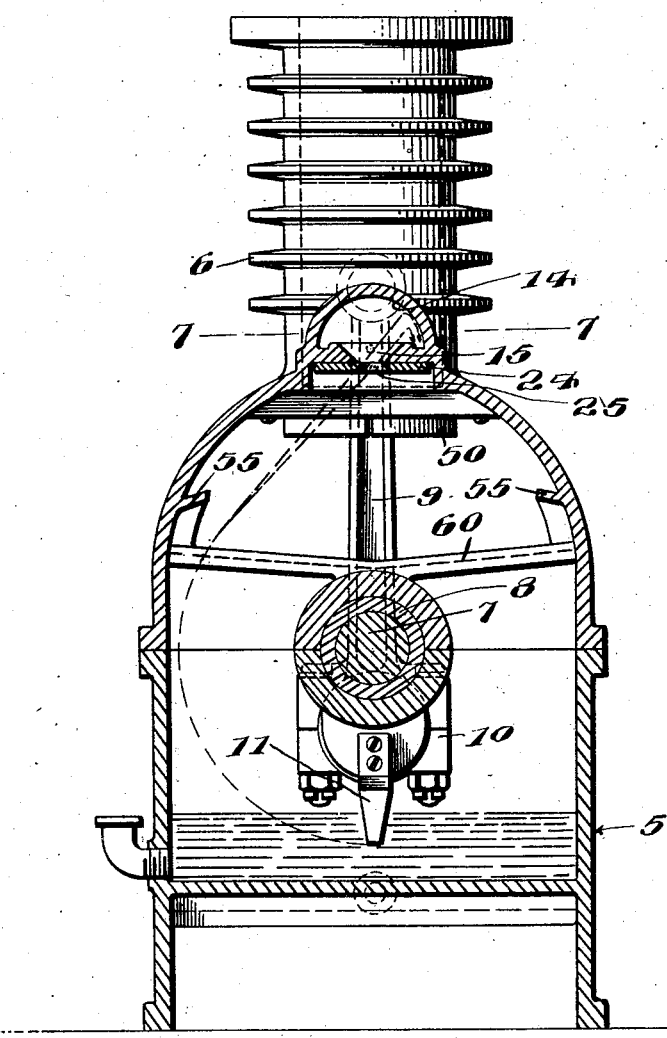
Fig. 4 is an end elevation of the compressors, the crank case being broken away to illustrate the lubricating system.

In the drawings, the numeral 5 designates a crank case upon which one or more cylinders 6 are secured. Fig. 1 illustrates that a crank shaft 7 is extended through main bearings 8 carried by the crank case and the connecting rod 9 is provided with the usual bearing 10.

Fig. 1 illustrates that the level of the oil is beneath the connecting rod bearing 10 so that the connecting rod bearing will at no time splash in the oil. However, the crank shaft 7 is provided with a pick-up finger or device 11 which dips into the oil and sweeps the oil up into a small reservoir or pocket 14 as shown in Fig. 4.

The pocket 14 is as clearly illustrated in Fig. 6 provided with a tapered opening 15, the upper portion of which is provided with a substantially U-shaped ledge or rib 16 which defines a U-shaped trough 18 for the reception of the oil which enters the pocket. Fig. 6 clearly illustrates that the oil which enters the pocket 14 strikes the curved crown or top wall of the pocket and then drops down into the U-shaped trough 18.

The branches of the U-shaped trough 18 are inclined down toward the bight portion of the trough so that the oil will be directed into the bight portion of the trough and then pass down through an inclined passage 20 for supplying the cylinder walls with oil.

The quantity of oil which may enter the pocket 14 is regulated by a rotatable valve 24 having a number of different sized openings 25, any one of which may be positioned in registration with the tapered opening 15. When an opening 25 of a smaller area than the opening 15 is positioned in registration with the opening 15, the quantity of oil admitted to the pocket 14 will, of course, be reduced and when a larger opening 25 is positioned in registration with the opening 15 the quantity of oil admitted to the pocket 14 will be correspondingly increased. The largest opening 25 is no larger than the opening 15. Particular attention is directed to Fig. 6 which illustrates that the openings 25 are tapered toward the upper ends thereof to admit the proper quantity of oil to the pocket 14 regardless of the direction of rotation of the crank shaft. In other words, the walls of the openings 25 are beveled opposite the direction of inclination of the opening 15.

The rotatable valve 24 is keyed or otherwise secured to a rotatable stem 28, the upper portion of which is provided with a disk-shaped head 30 having a plurality of notches 32 in line with the openings 25. These notches 32 are numbered and any one of the notches may be engaged by a locking spring 34 whereby to hold the proper opening 25 in alinement with the opening 15. By releasing the locking spring 34 the head 30 may be manually turned to vary the quantity of oil supplied to the pocket 14.

The under side of the pocket 14 is machined for engagement by the upper surface of the rotatable valve 24 and the valve may be pressed up into contact with the under side of the pocket 14 by a coil spring 36.

This coil spring 38 is mounted on the stem 28 between the lower portion of the housing 40 and the under side of the hub of the valve.

As previously stated, the oil which is fed through the opening 20 lubricates the wall of the cylinder and this oil is received in grooves 44 and 46 below and above the wrist pin 48. The wrist pin bushings are, of course, lubricated by the oil which enters the upper groove 46.

Attention is directed to Fig. 1 which illustrates that a baffle 50 is attached to the lower end of the cylinder and is provided with an opening 51 to receive the connecting rod 9 and to permit the same to partake of the limited swinging movement necessary to the operation of the engine. The baffle 50 may be in the nature of two separate plates similarly shaped and secured by screw bolts or other suitable means to the lower end of the cylinder.

A portion of the oil which is picked up by the finger or pick-up device 11 will splash against the wall of the crank case and it will drip into a ledge or gutter 55 formed integral with the crank case and discharging into an opening or pocket 56 above one of the main bearings in the engine. The oil thus received in the pocket 56 is utilized to lubricate the adjacent main bearing as a suitable passage 58 may be provided to allow the oil to flow from the pocket to the main bearing.

Fig. 1 illustrates that a lubricant collecting ledge 60 is positioned directly beneath the valve 24 and a shoulder 62 and collects the oil which drips from these parts so as to lubricate the other main bearing. The oil which is received in the ledge 60 enters a pocket 63 and lubricates the adjacent main bearing. It is thus seen that both the main bearings are thoroughly lubricated.

With reference to the foregoing description taken in connection with the accompanying drawing it will be seen that a lubricating system constructed in accordance with this invention may be employed without a separate pump. Or if desired a pump may be employed.

The supply of oil to the cylinder may be conveniently regulated by the operator without special skill since it is merely necessary to turn the head 30 by hand or otherwise to position the proper opening 25 in registration with the opening 15. The invention may be carried out in connection with a single or multi-cylinder engine.

Having thus described the invention, what is claimed is:

1. A structure of the character specified comprising a crank case, a cylinder mounted thereon and having an oil receiving pocket provided with an opening, a valve controlling said opening, and a combined adjusting and indicating means associated with said valve to hold the same in position and to indicate the position of the valve.

2. A compressor comprising a crank case, a cylinder mounted on the crank case, said cylinder being provided with a pocket having a bottom wall provided with a tapered opening, and a valve having different sized openings adapted to register with the opening in the bottom of said pocket.

3. A compressor comprising a crank case, a cylinder mounted on the crank case, said cylinder being provided with a pocket having a bottom wall provided with a tapered opening, a rotatable valve having different sized openings adapted to register with the opening in the bottom of said pocket, and a supporting stem carrying said valve and having a combined adjusting and indicating head.

4. A compressor comprising a crank case, a cylinder mounted on the crank case, said cylinder being provided with a pocket having a bottom wall provided with a tapered opening, a valve having different sized openings adapted to register with the opening in the bottom of said pocket, a suporting stem carrying said valve and having a combined adjusting and indicating head, said head being provided with numbered notches, and means engaged with said notches to hold the head in a set position.

5. A structure of the character specified comprising a crank case, a cylinder mounted on the crank case and having a pocket, the bottom wall of which is provided with a tapered opening for the passage of oil, a valve positioned beneath said opening and having a number of openings of different sizes adapted for registration with the opening in said pocket, a stem connected to said valve and having a notched head provided with indications, and a holding spring engaged with the notches of said head to hold the valve in a predetermined position.

6. A structure of the character specified comprising a crank case, a cylinder mounted on the crank case and having a pocket provided with a tapered opening for the passage of oil, a valve controlling said opening, a stem connected to said valve and having a notched head provided with indications, a holding spring engaged with the notches of said head to hold the valve in a predetermined position, a housing receiving said stem and a portion of said valve, and a spring urging said valve flatly into contact with the bottom wall of said housing.

7. A structure of the character specified comprising a crank case, a cylinder mounted on the crank case and having a pocket, the bottom wall of which is provided with a tapered opening for the passage of oil, a valve positioned beneath said opening and having a number of openings of different sizes adapted for registration with the opening in said pocket, a stem connected to said valve and having a notched head provided with indications, a holding spring engaged with the notches of said head to hold the valve in a predetermined position, a housing receiving said stem and a portion of said valve, and a spring urging said valve flatly into contact with the bottom wall of said housing, the bottom wall of said pocket being provided with a ledge of U-shaped formation defining a U-shaped trough.

8. A structure of the character specified comprising a crank case, a cylinder mounted thereon and having a pocket provided with an opening, a valve controlling said opening, a spring securing the valve in a predetermined position, a housing receiving said valve, and a spring urging said valve flatly into contact with one wall of said housing, the bottom wall of said pocket being provided with a ledge of U-shaped formation defining a U-shaped trough, the branches of which are inclined toward the bight portion of the trough.

In testimony whereof we affix our signatures.

JOHN A. TUSHAUS.
GEORGE F. PFEIFER.